United States Patent [19]
Benzimra et al.

[11] Patent Number: 5,812,547
[45] Date of Patent: Sep. 22, 1998

[54] SYSTEM AND METHOD FOR DYNAMIC TIME DIVISION ACCESS

[75] Inventors: Albert Benzimra, Essex County; Richard F. Pace, Warren County, both of N.J.

[73] Assignee: AT&T Corp., Middletown, N.J.

[21] Appl. No.: 701,342

[22] Filed: Aug. 22, 1996

[51] Int. Cl.⁶ .................................................. H04J 3/06
[52] U.S. Cl. ............................................................. 370/350
[58] Field of Search ...................................... 370/337, 329, 370/336, 345, 347, 350, 442, 503, 507, 509, 579; 375/358, 371, 372, 468, 349, 477; 455/502

[56] References Cited

U.S. PATENT DOCUMENTS

| | | | |
|---|---|---|---|
| 5,640,396 | 6/1997 | Cudak et al. | 370/350 |
| 5,655,216 | 8/1997 | Kato et al. | 370/337 |
| 5,684,794 | 11/1997 | Lopez et al. | 370/337 |

*Primary Examiner*—Ajit Patel
*Attorney, Agent, or Firm*—Alfred G. Steinmetz

[57] ABSTRACT

The present invention is a system and method for providing wireless packet data transmission without dependence on a fixed time slot access method or central timing mechanism. An available radio frequency (RF) channel in a communications network is divided into time frames which are further divided into time slots, wherein corresponding single time slots in each frame define a logical channel for carrying user packet data. The network includes a plurality of nodes divided into at least two time domain groups, wherein the time domain groups are divided into segments. Each of the time domain groups includes an independent timing source for synchronizing the time slots of logical channels within a time domain, wherein communication between nodes is accomplished through a data messaging scheme, such as a token passing scheme. Buffer segments interface between the time domain groups. The buffer segments maintain logical synchronization for communication between interconnected time domains by dynamically reassigning the token from the logical channel of a first time domain to an unused time slot of another logical channel in response to a given offset condition. The logical channel for dynamic reassignment is chosen such that the time slot of a first time domain does not overlap the logical channel used by a second time domain.

27 Claims, 7 Drawing Sheets

200

SYSTEM AND METHOD FOR DYNAMIC TIME DIVISION ACCESS

FIELD OF THE INVENTION

This invention relates to the field of wireless data communications and more particularly to a timing system and method utilized for wireless data transmissions.

BACKGROUND OF THE INVENTION

Current wireless packet data systems strictly utilize fixed time slot methods for the transmission of user data. That is, user data is permanently assigned to a certain time slot in a transmission stream for packet data transmissions throughout the system. Accordingly, any efforts to provide improved time synchronization for data transmission within a wireless system must account for this permanent time slot assignment thus leading to more costly design efforts. Moreover, development of new features or services to wireless packet data systems has been hindered because of the inflexibility created due to this strict adherence to a fixed time slot requirement.

Present time division access systems also require a central timing source, generally referred to as a clock. Since every time segment (incorporating multiple time slots) must adhere to this central clock, future system developments accommodating increased communications traffic are limited to compatibility with this central timing scheme.

Accordingly, there is a need for a more flexible wireless time division access methodology which is independent of a fixed time slot and a central timing clock.

SUMMARY OF THE INVENTION

The present invention is a system and method for providing wireless packet data transmission without dependence on a fixed time slot access method or central timing mechanism. An available radio frequency (RF) channel in a communications network is divided into time frames which are further divided into time slots, wherein corresponding single time slots in each frame define a logical channel for carrying user packet data. The network includes a plurality of nodes divided into at least two time domain groups, wherein the time domain groups are divided into segments. Each of the time domain groups includes an independent timing source for synchronizing the time slots of logical channels within a time domain, wherein communication between nodes is accomplished through a data messaging scheme, such as a token passing scheme. Buffer segments interface between the time domain groups. The buffer segments maintain logical synchronization for communication between interconnected time domains by dynamically reassigning the token from the logical channel of a first time domain to an unused time slot of another logical channel in response to a given offset condition. The logical channel for dynamic reassignment is chosen such-that the time slot of a first time domain does not overlap the logical channel used by a second time domain.

BRIEF DESCRIPTION OF THE DRAWINGS

A more complete understanding of the present invention may be obtained from consideration of the following description in conjunction with the drawings in which.

DETAILED DESCRIPTION

The present invention is a system and method for providing a dynamic time division access scheme for user data transmissions in a wireless packet based communications network. The present invention uses one or more single radio frequency (RF) channels divided into frames of multiple time slots, wherein a set of corresponding time slots produces a logical data channel. The time slots of the present invention dynamic time division access scheme carry small amounts of data per time slot of a logical channel to accommodate for a short time slot duration. The present invention is especially adapted for use in wireless systems where a wireless local area network (LAN) type of arrangement with extended inter-node distances and low data traffic is required. The present invention is described by way of an exemplary transport medium for radio channel usage for the transmission of data units from one node to another. As would be understood, by a person skilled in the art, an access layer in the transport medium is divided into two sub-layers, where one sub-layer handles the physical aspects of the air interface, and a second layer transmits the data units using a token passing mechanism from one node to an immediate next node.

Figure 1:
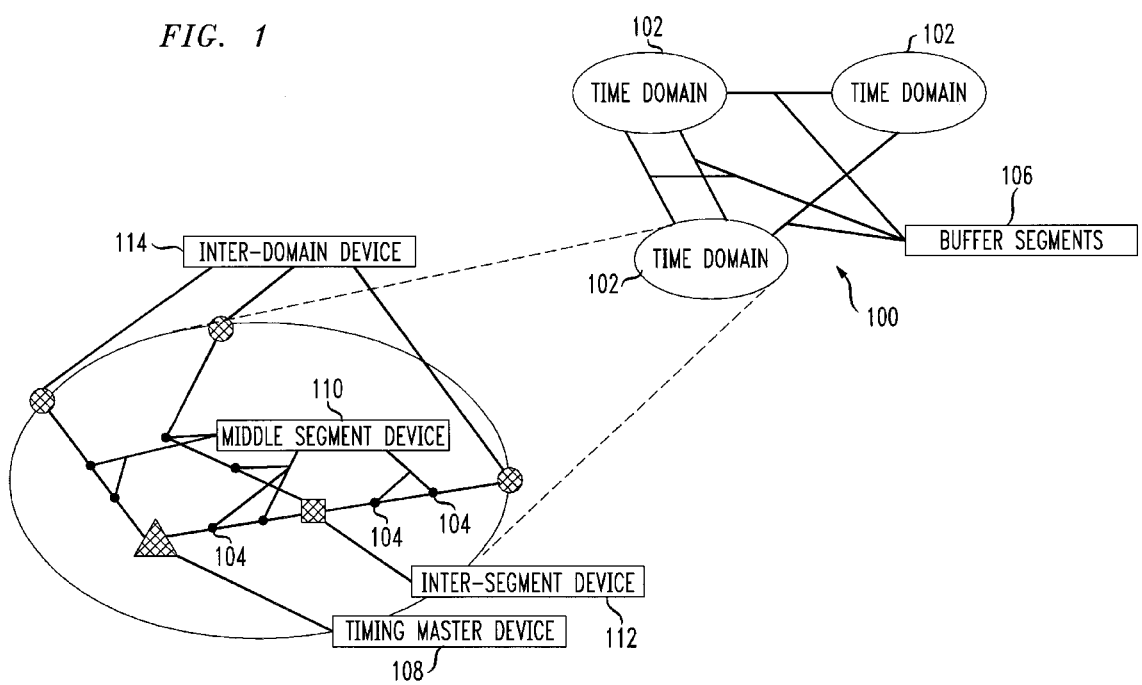
FIG. 1 represents an exemplary embodiment of a wireless communications network as described in accordance with the present invention.

Referring to FIG. 1 there is shown one exemplary embodiment of a wireless communications network 100 implemented in accordance with the present invention. As shown in FIG. 1, the network 100 is divided into a plurality of time domains 102, wherein each time domain 102 includes a given number of nodes 104, for example, base stations, adapted to transmit and receive communications traffic in the network. As will be explained, nodes within each time domain communicate with nodes in other time domains by way of buffer segments 106. As would be understood, because the present invention uses a time division transmission mechanism a source clock is required. However, each of the interconnected time domains of the network are operated by an independent clock source. This is advantageous in order to prevent the entire network from relying on a single clock. Accordingly, nodes 104 are grouped into time domains wherein every node in that time domain derives its channel/slot timing from a node declared as the timing master device (TMD) 108. A single TMD 108 node exists for each time domain 102.

Within a time domain 102 the network nodes 104 are grouped together into segments that can be thought of as being analogous to invisible LAN cables. A segment is comprised of one or more general purpose nodes termed middle segment devices (MSD) 110. These MSDs are interconnected to a special function node termed an inter-segment device (ISD) 112.

Segments use a circulating token to pass messages between nodes. The number of nodes per segment is limited to optimize the circulation of the token. The role of the ISD node 112 is to synchronize time slots within the logical communication channels of adjacent segments of a time domain and to send back the token within its own segment.

All nodes within segments using a given timing master device 108, beginning with the timing master device itself, are synchronized using a token issued from the timing master device 108 and then sent by the ISD 112. Token passing is a well known method of controlling access on a network, for example a LAN, in this case through the use of a special signal that determines which node is allowed to transmit. The token, which is actually a short message, is passed across the time segments from node to node. As would be understood, only the node with the token has the right to transmit information. If a node receives the token and has no information to transmit, the token is passed to the next node in the address sequence.

In accordance with the present invention, a time domain 102 does not contain any loop formed by internal segments. This is because since the time division access methodology of the present relies on the reception of a token and not on a formal clock source, the token synchronization cannot be guaranteed within a loop.

As mentioned, the role of the buffer segments 106 is to provide an interface between two or more time domains 102. In a preferred implementation of the present invention, a particular buffer segment is bordered by two inter-domain devices (IDD) 114, one from each time domain. The buffer segment then uses the logical channel of one of the IDD devices. An adopted convention is to use the channel (time slot) synchronization of the time domain with the lowest address. This logical channel is chosen in such a way that the corresponding time slot does not overlap the logical channel used by the other time domain coupled to the IDD.

Figure 2:
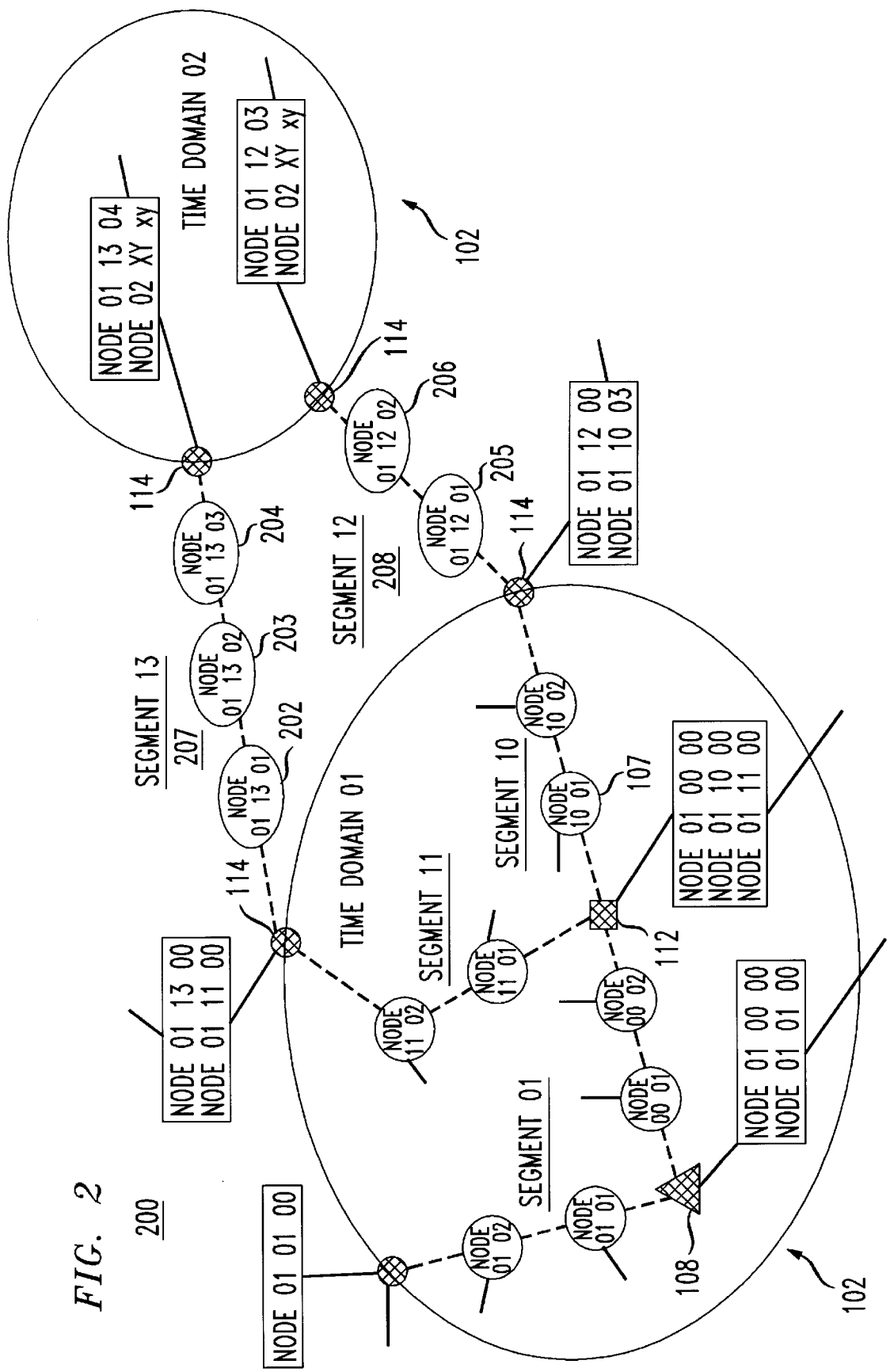
FIG. 2 and 2A represent an exemplary addressing scheme used in accordance with the present invention.
Figure 2A:
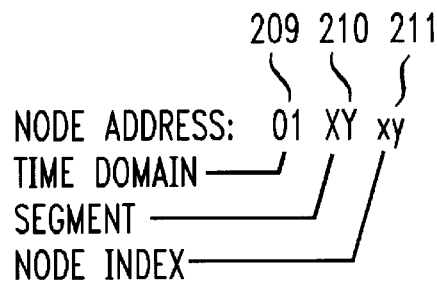

Referring now to FIG. 2, there is shown an exemplary addressing scheme implementable for the shown network 200. As shown in FIG. 2 and FIG. 2A, each time domain 102 receives a unique system wide address or domain index (DI) 209 and every segment within a time domain receives a unique segment address or segment index (SI) 210. Along the same lines, each node (or device) within a segment receives a unique device index or node index (NI) 211. Thus, a node address as shown in FIG. 2A incorporates a DI, SI and NI. As shown, an inter-segment device (ISD) 112, inter-domain device (IDD) 114 and timing master device (TMD) 108 nodes may have multiple distinct addresses within a time domain, since these nodes may interface to more than one segment. The buffer segments, for example buffer segment 207 including nodes 202, 203 and 204, and buffer segment 208 with nodes 205 and 206, belong to the time domain with the lowest address and have a segment address corresponding to this time domain. For example, as shown in FIG. 2, node 203 of buffer segment 208 has an address with a domain index (DI) 01 for the lower addressed time domain:01.

Figure 3:
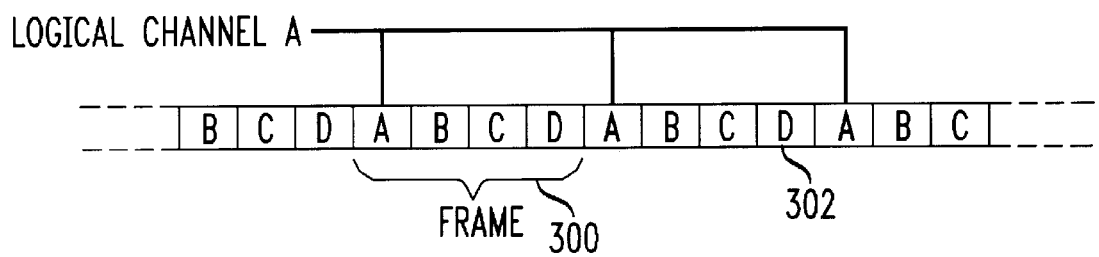
FIG. 3 is a time frame diagram representative of a logical channel in accordance with the present invention.

Referring to FIG. 3 there is shown an exemplary time frame 300 used in connection with the present invention. As shown, the RF link is divided into multiple time frames 300, themselves divided into time slots 302 of equal length shown as A, B, C and D. As will become apparent, a minimum of 4 time slots per frame 300 are required for the inter time domain communications to be guaranteed. Thus, the following description assumes a 4-time slot per frame arrangement, although a greater number of slots per frame may be utilized as would be understood by a person skilled in the art. Each time slot A, B, C and D in the time frame 300 represents a logical channel, therefore as shown, up to four logical channels can be used on a single RF channel. The number of time slots 302 per frame, which is application dependent, dictates the maximum number of segments emanating from a single inter-segment device (ISD) device. Similarly the length of the time frame, and therefore the length of the time slot is also application dependent. In the present invention, the length of the frame corresponds to the idle time that a node has to wait after it receives the token in order to be able to send the token to the next node.

Thus, there is a relationship between the length of the frame, the number of time slots and the length of the token. For a given frame length, the less time slots, the greater the message length and for a given number of time slots, the greater the frame length, the greater the message length and the idle time.

Figure 4:
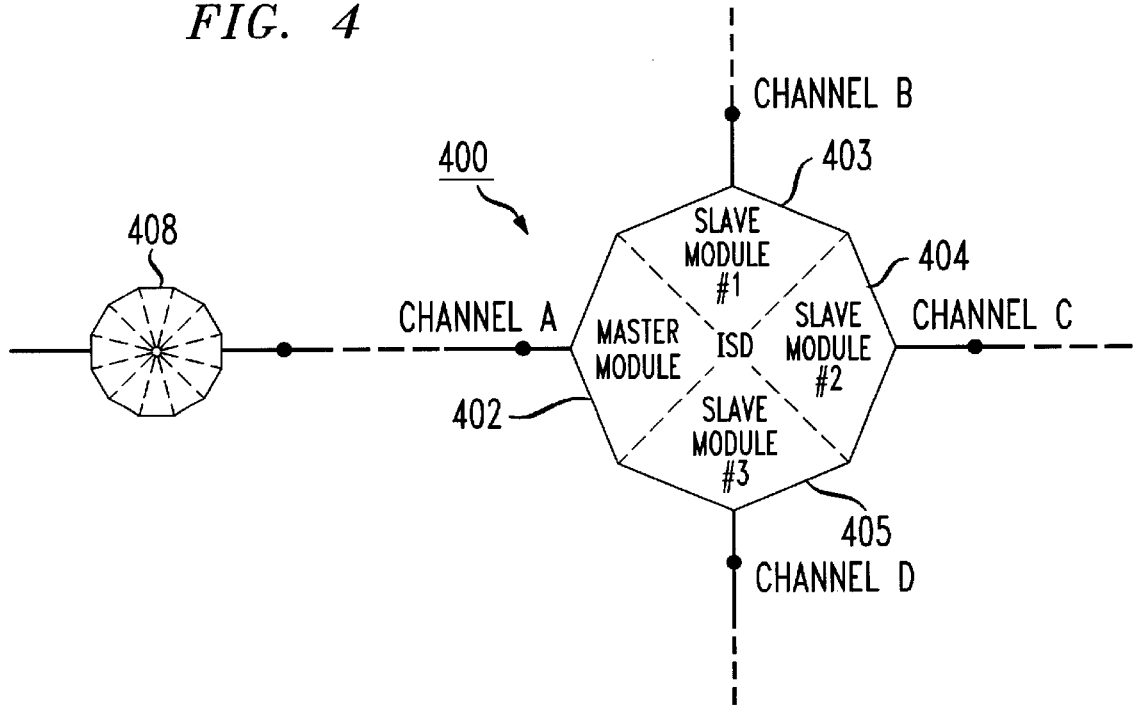
FIG. 4 shows functional diagrams for a timing master device and inter-segment device in accordance with the present invention.
Figure 5:
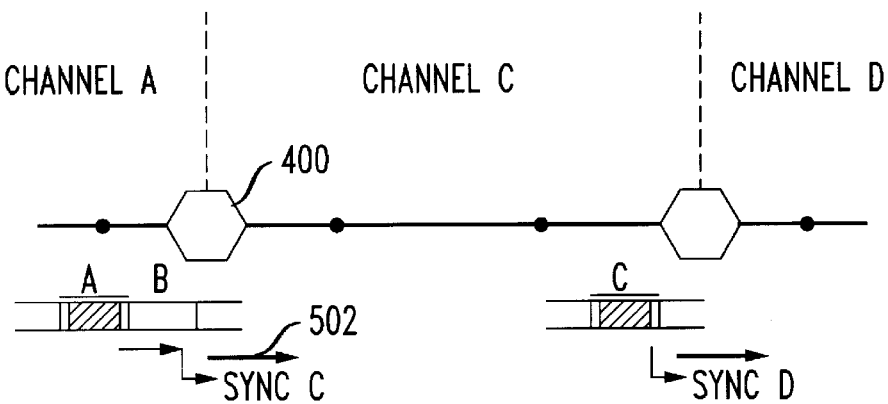
FIGS. 5 and 6 are diagrams illustrating the inter-segment synchronization mechanism in accordance with the present invention.

For radio communication between different segments within a time-domain, logical channel usage is synchronized by an inter-segment device (ISD) 400, as shown in FIG. 4. The ISD 400 is comprised of several modules, a master module 402 and several slave modules 403,404,405. As shown, the master module 402 interfaces with a segment 406 closest to the TMD node 408 on channel A, while the slave modules interface with other segments on channels B, C, D. The role of the ISD node 400 is to synchronize the logical channel usage between two or more segments. Referring to FIG. 5 in conjunction with FIG. 4, the synchronization mechanism for the present invention is illustrated. As shown, when an ISD node 400 receives a token on its master module, the master module will generate a SYNC signal 502 to every one of its slave modules for use on a respective logical channel. The slave modules can then only send a token toward their corresponding segments if they already hold the token and after receiving the SYNC signal 502 from the ISD master module 400. This procedure helps to ensure periodic channel re-synchronization.

Figure 6:
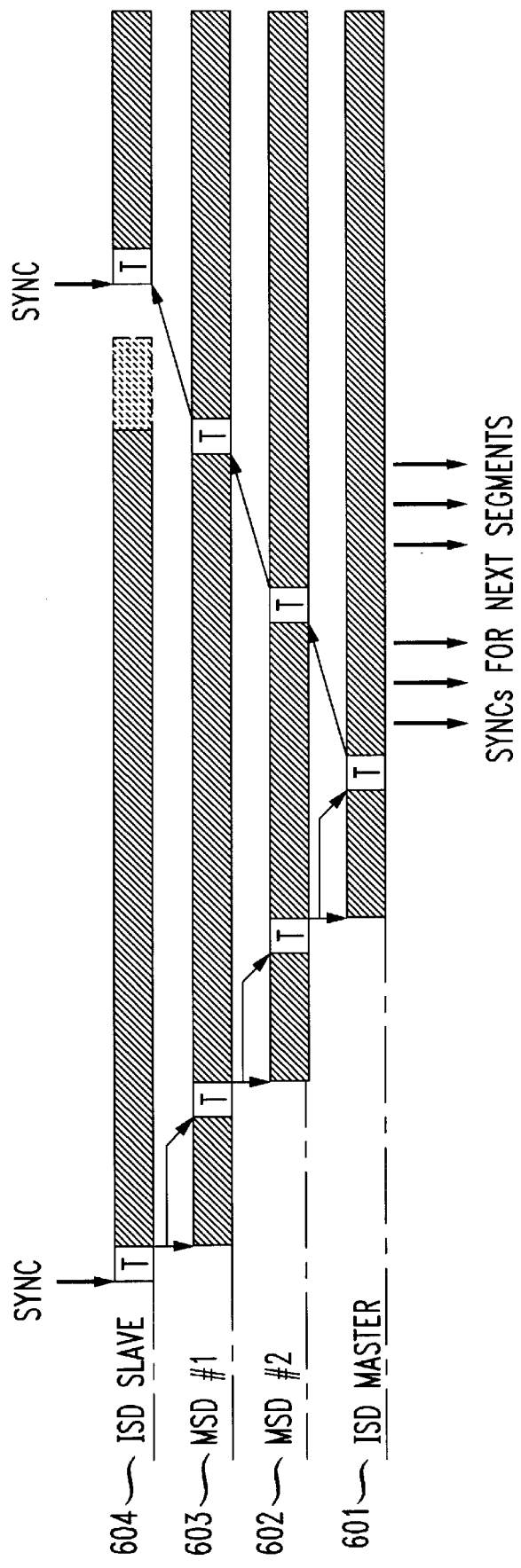

Once the token is received, nodes on a logical channel will wait a given length of time before propagating the token. In the context of the present description the given time will be three time slots. While the token is proceeding along its round trip propagation within a segment, however, a drift or offset in the ideal time slot alignment may occur. FIG. 6 illustrates this drift in time slot alignment for a segment having two middle segment devices (MSDs) 602, 603. As can be seen, even though a drift from the ideal time slot alignment does occur, each node within a segment keeps the relative timing inherited from the ISD slave node 604 in order to send and receive the token. Moreover, when an ISD master 601 receives a token from the segment closest to the TMD, the ISD realigns the token transmission to the other segments that the ISD controls. This realignment takes effect when the corresponding tokens (and SYNC signal) are received on these segments. This procedure advantageously ensures a minimal drift in time slot alignment. As would be understood, the synchronization procedure for the TMD node is somewhat different, since the TMD always re-synchronizes the transmission of the token on its internal clock.

Inter domain time division access is facilitated by means of the buffer segments, in that the time domains interface through one or several buffer segments. An established convention is that the buffer segments always use the timing of the segment with the lowest time domain address (DI) which is termed the controlling segment. As would be understood, the buffer segments do not interfere with any other segments since the time slot used might be changed in case of relative drifting between the interfacing time domain clocks. That is, to maintain synchronization between two time domains, the buffer segment must dynamically reassign the token to an unused time-slot in response to the time offset between the interconnecting time domains. As shown, a buffer segment of the present invention can use any of the three time slots not used by the controlling segment supplying the slot timing. Here, the segment of the other time domain interfacing with the buffer segment is called the slave segment.

Figure 7:
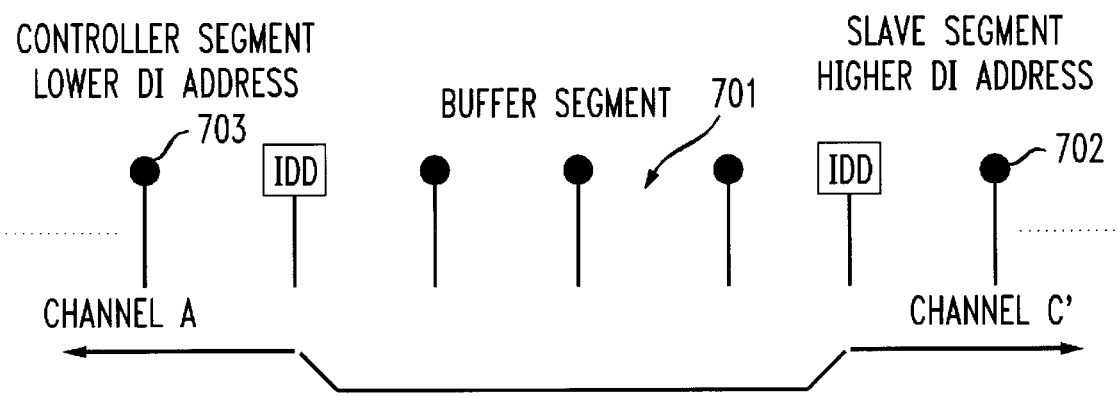
FIG. 7 shows one embodiment of a buffer segment as it interfaces between a controlling segment and a slave segment.
Figure 8:
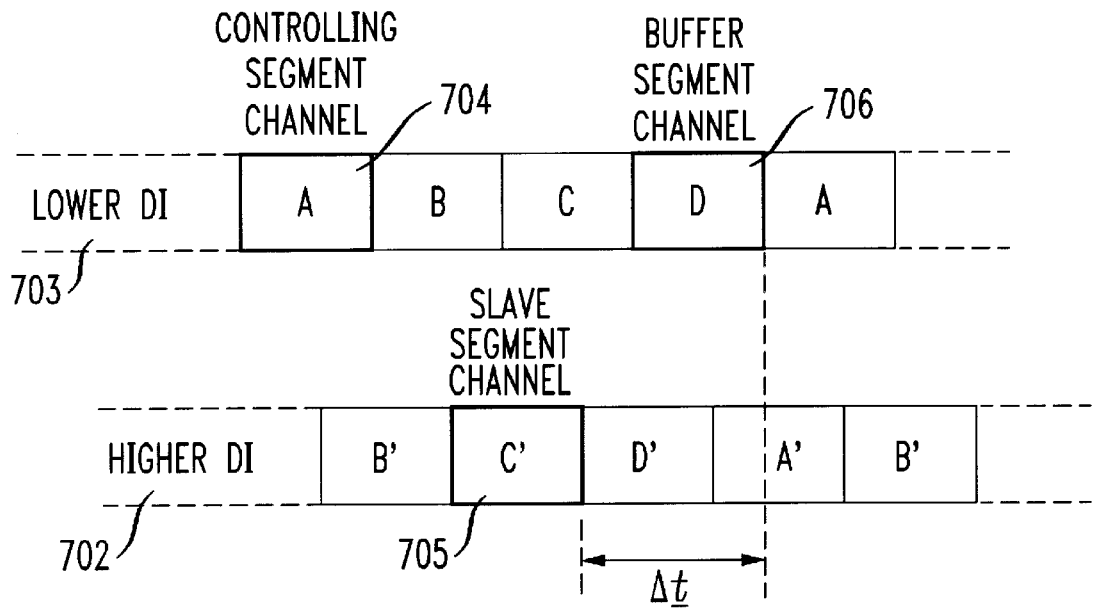
FIG. 8 is a timing diagram showing a time offset in time slot alignment in accordance with the present invention.

Referring to FIG. 7 there is shown a buffer segment 701 interfacing between a slave segment 702 and a controlling segment 703. As shown, the segment with the lower time domain address (DI), the controlling segment 703, uses channel A 704, and the slave segment 702 with the higher DI address uses channel C' 705. As illustrated, this is a worst case scenario,. where the least amount of time is available for interfacing two time domains. As can be seen from FIG. 8, if the slave segment 702 was using either the A' or B' channel, the buffer segment would have a choice for use between two channels, B or C and C or D, respectively. However, in this case only Channel D 706 can be used. FIG. 8 shows the initial channel allocation of a buffer segment, wherein the slot timings are not synchronized. As can be seen, channel D is the only free channel that does not interfere with slave segment channel C'.

In accordance with the present invention, the buffer segments incorporate a mechanism to alleviate the problem of clock drifting which would disturb the position of non-synchronized channels. As explained, a buffer segment interfaces to two time domains which do not have any timing synchronization, therefore, it is expected that the relative slot timing will drift and that a change of logical channel used for this interface will be necessary. In the present invention, the slave IDD node reports a time offset information $\Delta t$ to the controlling IDD 705. This time offset indicates the distance separating the buffer segment channel from the slave segment channel. The slave IDD node also provides the controlling IDD with an algebraic rate of clock drift calculated from the successive time offsets acquired between the reception of two inter time domain tokens. With this information the controlling IDD node is be able to switch the logical channel by relying on the time offset $\Delta t$ received. The switching of the logical channel occurs when the controlling ISD device detects that the drifting of the clock has become critical, i.e., reaches a critical threshold.

Figure 9:
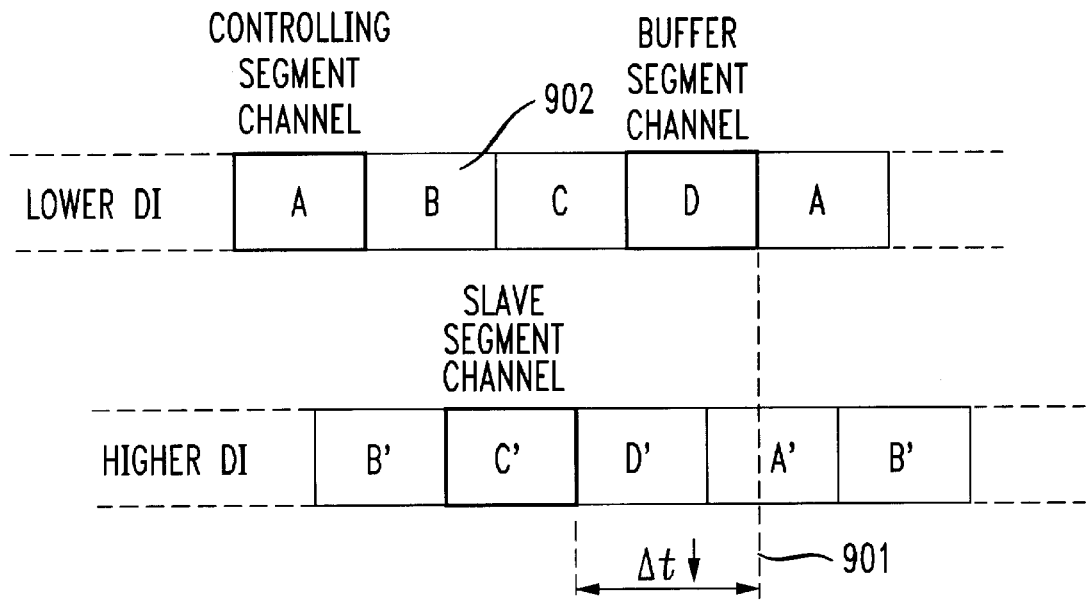
FIG. 9 is a timing diagram showing an alternate decreasing time offset in time slot alignment.

In a preferred embodiment of the present invention non-switching conditions will be indicated by the following time offsets $\Delta t$. In the case of a decreasing $\Delta t$, if $\Delta t \geq 1$ slot and the token is received timely, or if $\Delta t \geq T_{ch1}$,1 slot and the token has not been received, the channel will not be switched. $T_{ch1}$ (and $T_{ch2}$) represent the critical values that the controlling IDD node is monitoring to initiate a logical channel switch as soon as a returning token is missed. As shown in FIG. 9, if the time offset 901 is decreasing, the controlling IDD must wait for $\Delta t$ 901 to reach 1 time slot to switch to the next free channel, channel B 902 in this case. If the decreasing time offset $\Delta t$ is smaller than $T_{ch1}$, and the returning token misses its slot the controlling IDD must also switch to channel B.

Figure 10:
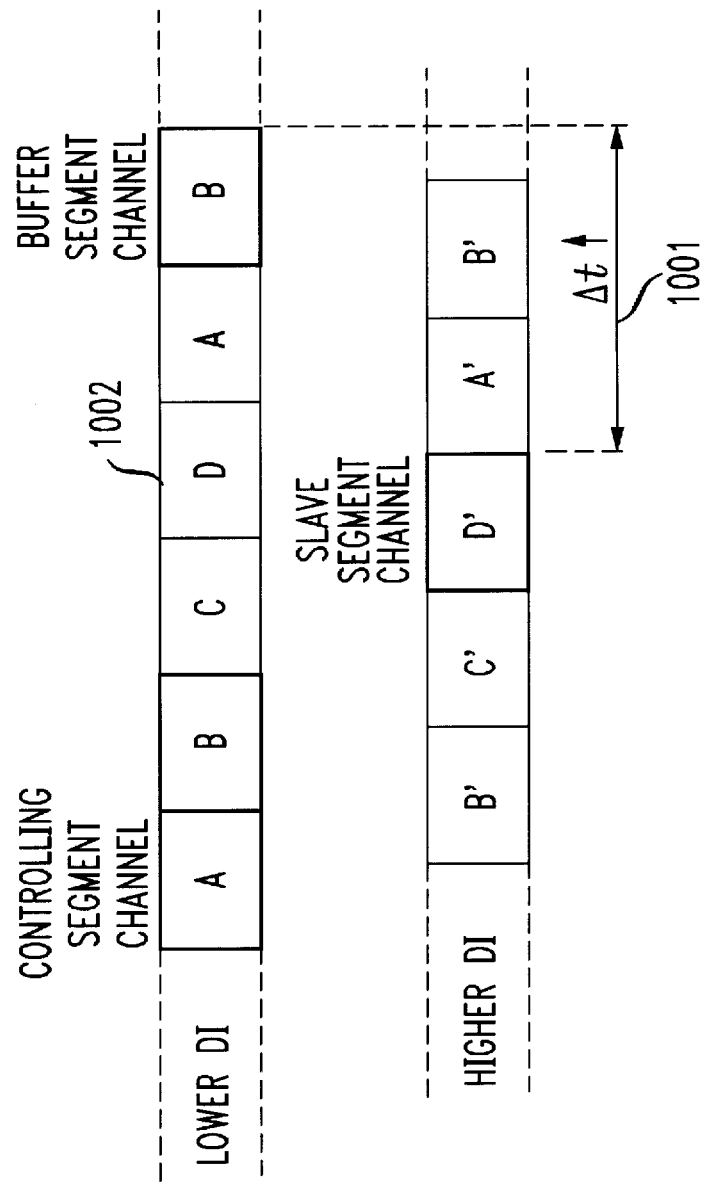
FIG. 10 is a timing diagram showing an alternate increasing time offset in time slot alignment.

In the case of an increasing $\Delta t$, if $\Delta t \leq 1$ slot and the token is received timely, or if $\Delta t \leq T_{ch2}$ where (2 slots<$T_{ch2}$<3 slots), the token will not be reassigned. As shown in FIG. 10, if the time offset 1001 is increasing, the controlling IDD waits for $\Delta t$ to reach 3 time slots to switch to the next free channel, the channel D 1002 in this case. If the increasing time offset $\Delta t$ is larger than $T_{ch2}$ and the returning token misses its slot, the controlling IDD also switches to channel D.

The slave IDD node restarts the timing of the offset at the end of its logical channel time slot. Thus, the IDD node requires two independent interrupt-driven timers and a separate counter to support the described inter time domain procedure. The IDD calculates the offset on every frame and re-synchronizes the offset acquisition every time it receives an inter-domain token, however, as would be understood by a person skilled in the art, re-synchronization may take place less frequently. The slave IDD includes in the returning inter-domain token the last offset acquired and the current rate of clock drift. As would be understood, this rate can optionally be used to refine the channel switching decision.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

What is claimed:

1. A communications network for providing time division wireless data communication across one or more radio frequency (RF) channels, said communications network comprising:

a plurality of nodes divided into at least two time domain groups, wherein said one or more RF channels is divided into a plurality of frames including multiple time slots in each frame, a given time slot in each of said frames comprising a logical channel, wherein each of said time domain groups includes an independent timing source for synchronizing said time slots of a logical channel; and at least one buffer segment for interfacing between said at least two time domain groups, each includes a plurality of nodes, said buffer segment adapted to maintain logical synchronization for communication between interconnected time domains by dynamically reassigning the logical channel between said time domains to an unused time slot of another logical channel in response to a given offset condition.

2. The network of claim 1, wherein said time domains are divided into a plurality of segments, each of said segments including multiple nodes and using a circulating token to pass messages between said nodes, said plurality of segments including at least one inter-segment device for synchronizing said time slots of adjacent segments and to recirculate said token within a segment.

3. The network of claim 2, wherein said inter-segment device includes a master module and one or more slave modules, said master module adapted to generate a synchronization signal to said slave modules upon receiving a token on its master module, said slave modules adapted to send a token toward a corresponding segment only if said slave modules hold said token after receiving said synchronization signal to thereby provide a periodic logical channel re-synchronization within said segments.

4. The network of claim 3, wherein said independent timing source is a timing master device node, wherein all segments in a time domain are synchronized on a token issued from said timing master device node.

5. The network of claim 2, wherein each of said nodes within said network include a unique node address, said node address including a time domain index, a segment index and a node index, said segment index being unique within a time domain and said node index being unique within a segment.

6. The network of claim 5, when nodes within said buffer segments have addresses corresponding to a lowest addressed time domain to which a buffer segment interfaces.

7. The network of claim 6, wherein a buffer segment interfaces to a time domain through an inter-domain device node, said buffer segment using the timing of an inter-domain device node having a lowest time domain index termed a controlling segment.

8. The network of claim 7, wherein an inter-domain device node coupled to a buffer segment which has a higher domain index is termed a slave segment, said slave segment operable to report a time offset between logical channels of said controlling segment and said slave segment.

9. The network of claim 8, wherein said slave segment is further operable to provide an algebraic rate of clock drift calculated from successive time offsets acquired between reception of two inter time domain tokens.

10. The network of claim 1, wherein the logical channel for dynamic reassignment of said logical channel is chosen such that the time slot of a first time domain does not overlap the logical channel used by a second time domain.

11. The network of claim 1, wherein said given offset is $\Delta t$, and for a decreasing offset, $\Delta t$, if $\Delta t \geq 1$ slot and the token is received timely, and alternatively if $\Delta t \geq T_{ch1} > 1$ slot and the token has not been received, where $T_{ch1}$ represents a threshold value being monitored, the logical channel will not be reassigned.

12. The network of claim 1, wherein said given offset is $\Delta t$, and for an increasing offset, if $\Delta t \leq 1$ slot and the token is received timely, and alternatively if $\Delta t \leq T_{ch2}$ where (2 slots$<T_{ch2}<$3 slots), where $T_{ch2}$ represents a threshold value being monitored, the logical channel will not be reassigned.

13. A method for providing time division data communication in a wireless communications network across one or more radio frequency (RF) channels, said communications network including a plurality of nodes adapted to communicate with one another, said method comprising the steps of:

dividing said plurality of nodes into at least two time domain groups, wherein said one or more RF channels is divided into a plurality of frames including multiple time slots in each frame, a given time slot in each of said frames comprising a logical channel;

maintaining an independent timing source in each of said time domain groups for synchronizing said time slots of a logical channel;

monitoring a time offset between logical channels of said at least two time domain groups; and dynamically reassigning the logical channel between time domains to an unused time slot of another logical channel in response to a given time offset condition, thereby maintaining logical synchronization for communication between interconnected time domains.

14. The method of claim 13, wherein said step of reassigning includes the step of assigning user data transmitted between said time domains to a logical channel that increases the time offset in response to said given time offset being below a predetermined threshold.

15. The method of claim 13, wherein said step of reassigning includes the step of assigning user data transmitted between said time domains to a logical channel that decreases the time offset in response to said given time offset being above a predetermined threshold.

16. The method of claim 13, wherein said nodes are adapted to communicate with one another by means of a token passing scheme and said step of reassigning is accomplished by assigning a token to said unused slot.

17. The method of claim 13, wherein said time domains are divided into a plurality of segments, each of said segments including multiple nodes and using a circulating token to pass messages between said nodes, said plurality of segments including at least one inter-segment device, further including the step of synchronizing said time slots of adjacent segments and recirculating said token within a segment by means of said inter-segment device.

18. The method of claim 17, wherein said inter-segment device includes a master module and one or more slave modules, wherein said step of synchronizing includes the step of generating a synchronization signal from said master module to said slave modules upon receiving a token on said master module, said slave modules adapted to send a token toward a corresponding segment only if said slave modules hold said token after receiving said synchronization signal to thereby provide a periodic logical channel re-synchronization within said segments.

19. The method of claim 17, wherein each of said nodes within said network include a unique node address, said node address including a time domain index, a segment index and a node index, said segment index being unique within a time domain and said node index being unique within a segment.

20. The method of claim 19, when said time domains interface with one another through buffer segments and nodes within said buffer segments have addresses corresponding to a lowest addressed time domain to which a buffer segment interfaces.

21. The method of claim 20, wherein said buffer segments interface to a time domain through an inter domain device node, and said buffer segments use the timing of an inter-domain device node having a lowest time domain index termed a controlling segment.

22. The method of claim 21, wherein an inter-domain device node coupled to a buffer segment which has a higher domain index is termed a slave segment, further including the step of reporting a time offset between logical channels of said controlling segment and said slave segment to said controlling segment.

23. The method of claim 22, wherein said slave segment is further operable to provide an algebraic rate of clock drift calculated from successive time offsets acquired between reception of two inter time domain tokens.

24. The network of claim 13, wherein the logical channel for dynamic reassignment of said token is chosen such that the time slot of a first time domain does not overlap the logical channel used by a second time domain.

25. The method of claim 13, wherein said given offset is $\Delta t$, and for a decreasing offset, $\Delta t$, if $\Delta t \geq 1$ slot and the token is received timely, and alternatively if $\Delta t \geq T_{ch1} > 1$ slot and the token has not been received, where $T_{ch1}$ represents a threshold value being monitored, the logical channel will not be reassigned.

26. The method of claim 13, wherein said given offset is $\Delta t$, and for an increasing offset, $\Delta t$, if $\Delta t \leq 1$ slot and the token is received timely, and alternatively if $\Delta t \leq T_{ch2}$ where (2 slots$<T_{ch2}<$3 slots), where $T_{ch2}$ represents a threshold value being monitored, the logical channel will not be reassigned.

27. The method of claim 17, wherein a time frame includes n times slots and a node waits n-1 times slots before propagating said token.

* * * * *